United States Patent
Zeng et al.

(10) Patent No.: US 12,165,681 B1
(45) Date of Patent: Dec. 10, 2024

(54) TOUCHDOWN DETECTION AND WRITE-SPACING SETTING IN MAGNETIC RECORDING HEADS WITH PROTRUDING FEATURES

(71) Applicant: Western Digital Technologies, Inc., San Jose, CA (US)

(72) Inventors: Qinghua Zeng, Fremont, CA (US); Jimmy Zhang, Irvine, CA (US); Sukumar Rajauria, San Jose, CA (US); Masaru Furukawa, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/468,448

(22) Filed: Sep. 15, 2023

(51) Int. Cl.
*G11B 5/60* (2006.01)

(52) U.S. Cl.
CPC ............ *G11B 5/6076* (2013.01); *G11B 5/607* (2013.01)

(58) Field of Classification Search
None
See application file for complete search history.

(56) References Cited

U.S. PATENT DOCUMENTS

| | | | |
|---|---|---|---|
| 7,158,325 B1 * | 1/2007 | Hu | G11B 5/6076 |
| 7,436,620 B1 * | 10/2008 | Kang | G11B 5/6064 |
| 8,837,075 B2 | 9/2014 | Hanchi et al. | |
| 8,902,720 B1 | 12/2014 | Schreck et al. | |
| 9,042,208 B1 | 5/2015 | Knigge et al. | |
| 9,595,280 B2 | 3/2017 | Canchi et al. | |
| 9,786,309 B1 | 10/2017 | Knigge et al. | |
| 10,217,481 B1 | 2/2019 | Xiong et al. | |
| 10,395,678 B1 | 8/2019 | Rajauria et al. | |
| 10,748,561 B1 | 8/2020 | Hwang et al. | |
| 10,783,913 B1 | 9/2020 | Rajauria et al. | |
| 2007/0230002 A1 * | 10/2007 | Kassab | G11B 5/6005 360/75 |
| 2009/0122444 A1 * | 5/2009 | Ma | G11B 5/60 360/97.12 |
| 2009/0290246 A1 * | 11/2009 | Tse | G11B 5/455 360/31 |

(Continued)

OTHER PUBLICATIONS

B. X. Xu, Z. H. Cen, J. F. Hu, and J. W. H. Tsai, "Alternative material study for heat assisted magnetic recording transducer application," Journal of Applied Physics 117, 17C112 (2015).

(Continued)

*Primary Examiner* — Peter Vincent Agustin (57) ABSTRACT

Methods, data storage devices, and computer-readable media for setting the flying height of a recording head are disclosed. A method may set a value of a control parameter of the recording head to force a predetermined location of the recording head to be a touchdown location. The method may involve incrementally moving the recording head toward a surface of a recording media, and, using a temperature sensor of the recording head, detecting an onset of touchdown at the touchdown location as the recording head is incrementally moving toward the surface of the recording media. The method may set the fly-height control power by backing off from an initial fly-height control power value, which may be a sum of a power level at which the onset of touchdown at the touchdown location was detected and a power corresponding to the value of the control parameter.

21 Claims, 8 Drawing Sheets

(56) References Cited

U.S. PATENT DOCUMENTS

| | | | | |
|---|---|---|---|---|
| 2010/0073795 A1* | 3/2010 | Amano | ............... | G11B 27/36 |
| | | | | 360/75 |
| 2010/0123970 A1* | 5/2010 | Saikawa | ............ | G11B 5/6005 |
| | | | | 360/246.2 |
| 2010/0208387 A1* | 8/2010 | Ehrlich | ............... | G11B 5/607 |
| | | | | 360/97.12 |
| 2013/0094104 A1 | 4/2013 | Ngan et al. | | |

OTHER PUBLICATIONS

Gui-Gen Wanga, Xu-Ping Kuanga, Hua-Yu Zhanga, Can Zhua, Jie-Cai Hana, Hong-Bo Zuob, Hong-Tao Mac, "Silicon nitride gradient film as the underlayer of ultra-thin tetrahedral amorphous carbon overcoat for magnetic recording slider," Materials Chemistry and Physics 131 (2011) 127-131.

Raksak Rujipornkasem, "Touch Down Detection at Spin-Stand Level by Touch Down Sensor," Jul. 2014.

Sripathi V. Canchi, David B. Bogy, Run-HanWang, and Aravind N.Murthy, "Parametric Investigations at the Head-Disk Interface of Thermal Fly-Height Control Sliders in Contact," Advances in Tribology, vol. 2012, Article ID 303071.

Weerayoot Wachirapornpongsa, "Head Disk Interface Prediction Using the Servo Variable Gain Amplifier and Head Media Spacing," May 2015.

* cited by examiner

TOUCHDOWN DETECTION AND WRITE-SPACING SETTING IN MAGNETIC RECORDING HEADS WITH PROTRUDING FEATURES

BACKGROUND

Data storage devices such as disk drives comprise a disk and a head connected to a distal end of an actuator arm that is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal is demodulated by a suitable read channel. Heat assisted magnetic recording (HAMR) can improve the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) can also improve the quality of written data by using a spin torque oscillator (STO) to apply a high-frequency auxiliary magnetic field to the media close to the resonant frequency of the magnetic grains, thereby enabling the magnetic field generated by the write coil to more readily magnetize the disk surface.

Because the quality of the write/read signal depends on the fly height of the head, conventional heads may also comprise an actuator for controlling the fly height. Any suitable fly height actuator (FHA) may be used, such as a suitable thermal actuator that adjusts the fly height through thermal expansion, or a suitable mechanical actuator such as a suitable piezoelectric actuator that adjusts the fly height through mechanical deflection.

The distance between the reader/writer and the recording media, known as the fly height, can be an important parameter to the stability and reliability of data recording. To achieve accurate data recording and prevent potential damage to the recording media, it is important to maintain a consistent and controlled fly height. Thermal fly-height control (TFC) can be used to control the distance between the read head and the recording media during the reading process and/or to control the distance between the write head and the recording media during the writing process. Different fly heights can be used for reading and for writing.

SUMMARY

This summary represents non-limiting embodiments of the disclosure.

Disclosed herein are devices, methods, and systems for improved fly-height control of recording heads. Specifically disclosed are devices, systems, and methods for touchdown detection and write-spacing setting in magnetic recording heads that have protruding features.

In some aspects, the techniques described herein relate to a method of setting a flying height of a recording head, the method including: setting a value of a control parameter of the recording head to force a predetermined location of the recording head to be a touchdown location; after setting the value of the control parameter, incrementally moving the recording head toward a surface of a recording media; using a temperature sensor of the recording head, detecting an onset of touchdown at the touchdown location as the recording head is incrementally moving toward the surface of the recording media; and backing off from an initial fly-height control power value, wherein the initial fly-height control power value is a sum of (a) a power level at which the onset of touchdown at the touchdown location was detected and (b) a power corresponding to the value of the control parameter. In some embodiments, the control parameter is a write current (e.g., IADn).

In some aspects, the recording head includes a write head, and the control parameter is a write current amplitude, and the temperature sensor includes a near-field transducer (NFT) temperature sensor.

In some aspects, the predetermined location of the recording head is a protrusion extending from a media-facing surface of the recording head.

In some aspects, the recording head includes a write head, and the protrusion is a window over at least a portion of the write head.

In some aspects, the control parameter is a write current amplitude, and the temperature sensor includes a near-field transducer (NFT) temperature sensor.

In some aspects, detecting the onset of touchdown at the touchdown location includes determining that a temperature sensor slope meets a condition. In some aspects, the condition is that the temperature sensor slope is less than a threshold. In some aspects, the threshold is predetermined and/or is determined based on modeling.

In some aspects, backing off from the initial fly-height control power value includes adjusting the initial fly-height control power value based on one or more of: (a) an expected write-current-induced pole tip protrusion during write operations, (b) a laser-induced pole tip protrusion, or (c) a back-off height during write operations.

In some aspects, incrementally moving the recording head toward the surface of the recording media includes: setting a fly-height control power to an initial power value; and in one or more discrete steps, increasing the fly-height control power from the initial power value. In some such embodiments, detecting the onset of touchdown at the touchdown location as the recording head is incrementally moving toward the surface of the recording media includes the temperature sensor of the recording head detecting a temperature at each of the one or more discrete steps.

In some aspects, the techniques described herein relate to a data storage device, including: a recording media; a slider including a recording head, the recording head including a temperature sensor; and control circuitry coupled to the recording head, wherein: a media-facing surface of the recording head includes a protrusion extending toward a surface of the recording media, and the control circuitry is configured to: (a) set a value of a control parameter of the recording head to force the protrusion to be a touchdown location, (b) after (a): (i) move the recording head toward the surface of the recording media in a plurality of increments, and (ii) obtain temperature readings from the temperature sensor at the plurality of increments, (c) determine a temperature slope using the temperature readings, (d) based on the temperature slope, identify an onset of touchdown at the touchdown location, and (e) reduce an initial thermal fly-height control power value, wherein the initial fly-height control power value is a sum of a power level at which the onset of touchdown at the touchdown location was identified and a power corresponding to the value of the control parameter (e.g., IADn).

In some aspects, the control parameter is a write current amplitude.

In some aspects, the protrusion is a window over at least a portion of a write head, and wherein the temperature sensor is a near-field transducer (NFT) temperature sensor.

In some aspects, the control circuitry includes a processor configured to execute machine-executable instructions. In some aspects, when executed by the processor, the machine-executable instructions cause the processor to identify the onset of touchdown at the touchdown location by comparing the temperature slope to a threshold.

In some aspects, when executed by the processor, the machine-executable instructions cause the processor to reduce the initial fly-height control power value by subtracting (a) an expected write-current-induced pole tip protrusion during write operations, (b) a laser-induced pole tip protrusion, or (c) a back-off height during write operations.

In some aspects, the control circuitry is configured to move the recording head toward the surface of the recording media in increments by incrementally increasing a current provided to the recording head. In some aspects, the current is a write current.

In some aspects, the control circuitry is configured to identify the onset of touchdown at the touchdown location when the temperature slope is less than or equal to a threshold.

In some aspects, the techniques described herein relate to a non-transitory computer-readable medium including machine-executable instructions that, when executed, cause at least one processor to: (a) set a value of a control parameter of a recording head to force a protrusion of the recording head to be a touchdown location; (b) after (a): (i) direct an actuator to move the recording head toward a recording media in a plurality of increments, and (ii) obtain, from a temperature sensor of the recording head, temperature readings at the plurality of increments; (c) determine a temperature slope using the temperature readings; (d) based on the temperature slope, identify an onset of touchdown at the touchdown location; (e) calculate a fly-height control power adjustment; and (f) subtract the fly-height control power adjustment from an initial fly-height control power value, wherein the initial fly-height control power value is a sum of a power level at which the onset of touchdown at the touchdown location was identified and a power corresponding to the value of the control parameter (e.g., IADn).

In some aspects, the control parameter of the recording head is a write current (e.g., IADn), and the fly-height control power adjustment includes a component representing an expected write-current-induced pole tip protrusion during write operations.

BRIEF DESCRIPTION OF THE DRAWINGS

Objects, features, and advantages of the disclosure will be readily apparent from the following description of certain embodiments taken in conjunction with the accompanying drawings in which.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

As described further below, the recording head of a data storage device can have small-scale protrusions at the air-bearing surface (ABS) due to manufacturing variability, deliberate design choices, or other reasons. The presence of these small protrusions can create challenges for TFC because of the variability in the touchdown location, the small dimensions of some protrusion(s), and the complex topography (e.g., of the recording head, the surface of the recording media, etc.). One issue is that the characteristics of protrusions (e.g., existence, location, extent/height, etc.) can be inconsistent across sliders, even if they have the same design. For example, the characteristics of protrusions that result from manufacturing variability are not the same in all sliders, even if their design is the same. Another issue is that the small surface area of some protrusions makes it difficult to detect touchdown using conventional approaches (e.g., by detecting off-track or down-track motion due to friction). Conventional techniques may be insufficient to detect touchdown and determine the appropriate TFC. As a result, it can be difficult to set the fly height.

Overall, when there is no protrusion, the touchdown area is relatively large, and off-track motion and/or downtrack motion due to friction can be used to detect touchdown. When there is a protrusion, however, because of the variability in its location and the small touchdown area, touchdown detection becomes more difficult, as does TFC due to variability in the touchdown location.

Disclosed herein are devices, systems, and methods that address challenges presented by protrusions at the ABS of recording heads.

Figure 1:
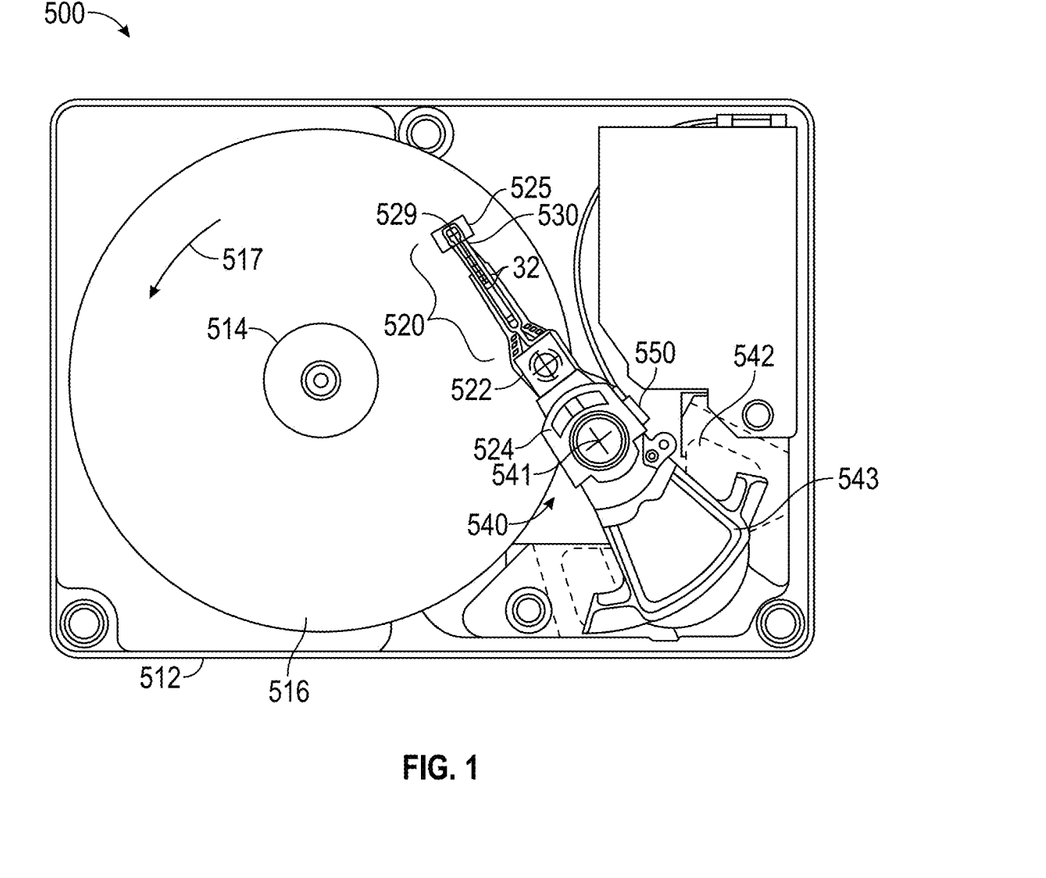
FIG. 1 is a top view of an example of a data storage device into which embodiments disclosed herein can be incorporated.

FIG. 1 is a top view of an example of a data storage device 500 (e.g., a HAMR data storage device, a MAMR data storage device, etc.) into which embodiments disclosed herein can be incorporated. FIG. 1 illustrates a head/disk assembly of the data storage device 500 with the cover removed. The data storage device 500 includes a rigid base 512 supporting a spindle 514 that supports a recording media 516 (or multiple recording media 516). The spindle 514 is rotated by a spindle motor (not shown), which, in operation, rotates the recording media 516 in the direction shown by the curved arrow 517. The data storage device 500 has at least one load beam assembly 520 having an integrated lead suspension (ILS) or flexure 530 with an array 32 of electrically conductive interconnect traces or lines. The at least one load beam assembly 520 is attached to rigid arms 522 connected to an E-shaped support structure, sometimes called an E-block 524. The flexure 530 is attached to a slider 525, which is typically formed of a composite material, such as a composite of alumina/titanium-carbide ($Al_2O_3$/TiC).

A recording head 529 for recording to a recording media 516 is located at the end or trailing surface of the slider 525. The recording head 529 comprises a read portion for reading from the recording media 516 and a write portion for writing to the recording media 516. FIG. 1 illustrates only one recording media 516 surface with the slider 525 and recording head 529, but there may be multiple recording media 516 stacked on a hub that is rotated by the spindle motor, with a separate slider 525 and recording head 529 associated with each surface of each recording media 516.

As the recording media 516 rotates, the recording media 516 drags gas (which may be air, helium, etc.) under the slider 525 in a direction approximately parallel to the tangential velocity of the recording media 516. The slider 525 has a media-facing air-bearing surface (ABS) that causes the slider 525 to ride on a cushion or bearing of gas, typically air or helium, generated by rotation of the recording media 516. (It is to be understood that the term "air-bearing surface (ABS)" is used herein to refer to the gas-bearing surface of a slider, regardless of whether the gas within the drive is air or another gas (e.g., helium) or a mixture of gases.) As the air or gas passes under the slider 525 ABS, compression of the air or gas along the air flow path causes the air pressure between the recording media 516 and the slider 525 to increase, which creates a hydrodynamic lifting force that counteracts the tendency of the at least one load beam assembly 520 to push the slider 525 toward the recording media 516. The slider 525 thus flies above the recording media 516 but in close proximity to the surface of the recording media 516. The flexure 530 enables the slider 525 to "pitch" and "roll" on the air (or gas) bearing generated by the recording media 516 as it rotates. Thus, during normal operation, the recording head 529 remains slightly above the surface of the recording media 516, riding on the air bearing.

The separation or spacing between the slider 525 and the surface of the recording media 516 while the slider 525 flies is called the fly height. The flying dynamics of the slider 525, and thus the fly height, are influenced by factors such as the rotation speed of the recording media 516, the aerodynamic shape of the ABS of the slider 525, the load force applied to the slider 525 by the components to which it is attached, and the pitch and roll torques applied to the slider 525 by the at least one load beam assembly 520 and/or flexure 530. As noted above, controlling the fly height can be important to achieve accurate data recording and prevent potential damage to the recording media 516.

The data storage device 500 of FIG. 1 also includes a rotary actuator assembly 540 rotationally mounted to the rigid base 512 at a pivot point 541. The rotary actuator assembly 540 may include a voice coil motor (VCM) actuator that includes a magnet assembly 542 fixed to the rigid base 512 and a voice coil 543. When energized by control circuitry, which may include, for example, a processor, the voice coil 543 moves and thereby rotates E-block 524 with the rigid arms 522 and the at least one load beam assembly 520 to position the read/write head over the data tracks on the recording media 516. As the recording media 516 rotates in the direction of the curved arrow 517 shown in FIG. 1, the movement of the rotary actuator assembly 540 allows the recording head 529 on the slider 525 to access different data tracks on the recording media 516. The array 32 of electrically conductive interconnect traces or lines connects at one end to the recording head 529 and at its other end to read/write circuitry contained in an electrical module or chip 550, which, in the data storage device 500 of FIG. 1, is secured to a side of the E-block 524. The chip 550 includes a read/write integrated circuit (R/W IC). The chip 550 may include a processor (e.g., as part of the R/W IC or external to it). The chip 550 may assist in the implementation of the techniques described herein.

To read information from the recording media 516, the recording head 529 may include at least one read head or read sensor. The read sensor(s) in the recording head 529 may include, for example, one or more giant magnetoresistance (GMR) sensors, tunneling magnetoresistance (TMR) sensors, or another type of magnetoresistive sensor. When the slider 525 passes over a track on the recording media 516, the recording head 529 (via the read head) detects changes in resistance due to magnetic field variations recorded on the recording media 516, which represent the recorded bits.

To write information to the recording media 516, the recording head 529 includes a write head (or write portion). In general, the write head can be any suitable write head. Some of the examples included herein describe and illustrate a HAMR head, but it is to be appreciated that the disclosed techniques are applicable to other types of recording head 529.

In operation, after the voice coil 543 has positioned the recording head 529 over the data tracks on the recording media 516, the recording head 529 may be used to write information to one or more tracks on the surface of the recording media 516 and to read previously-recorded information from the tracks on the surface of the recording media 516. The tracks may comprise discrete data islands of magnetizable material (e.g., bit-patterned media), or the recording media 516 may have a conventional continuous magnetic recording layer of magnetizable material. Processing circuitry in the data storage device 500 (e.g., on the chip 550) provides to the recording head 529 signals representing information to be written to the recording media 516 and receives from the recording head 529 signals representing information read from the recording media 516.

Figure 2:
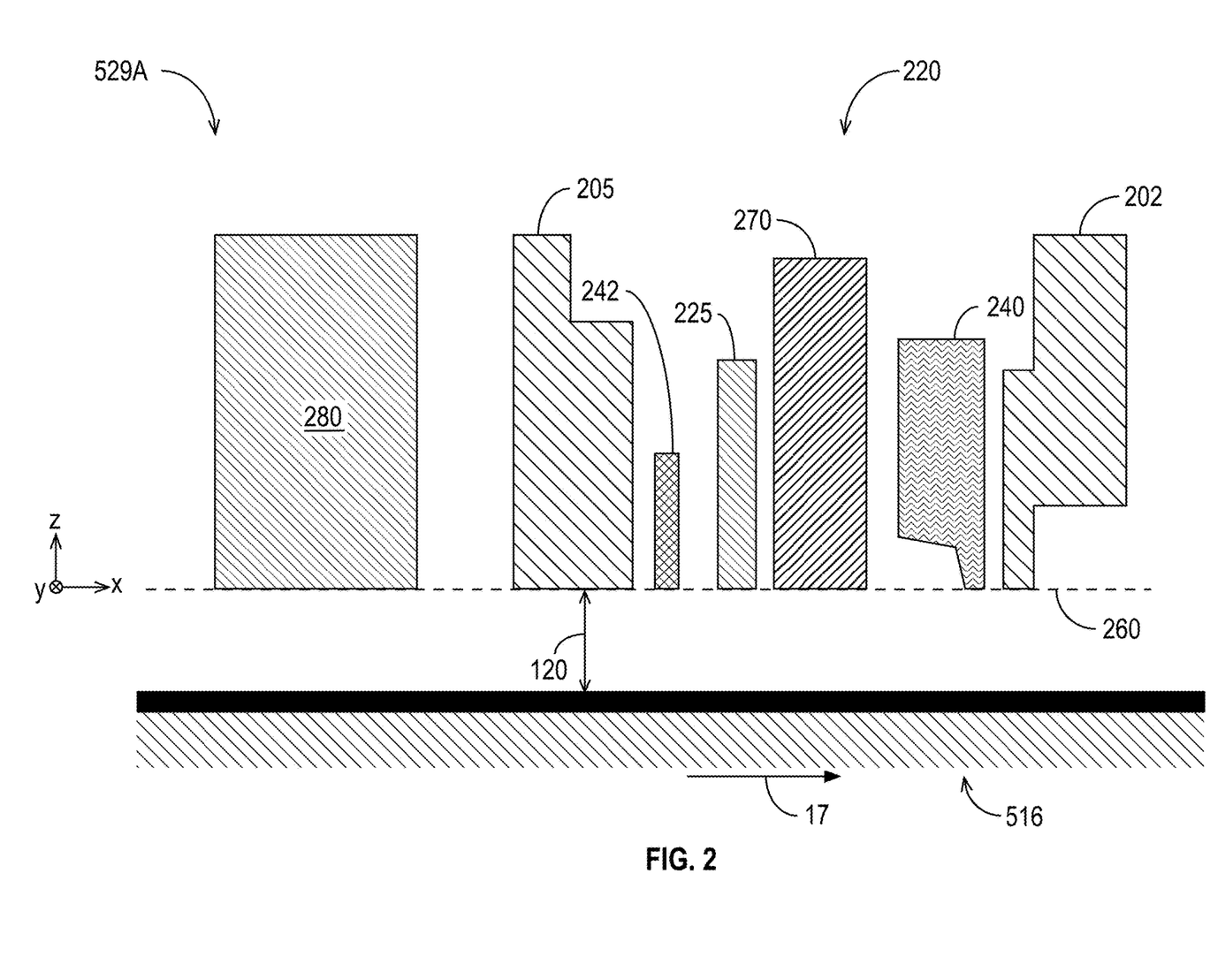
FIG. 2 illustrates portions of an example of a HAMR recording head that could be included in the slider of a data storage device in accordance with some embodiments.

FIG. 2 illustrates portions of an example of a HAMR recording head 529A that could be included in the slider 525 described above in the discussion of FIG. 1 to read data from and write data to the magnetic recording layer of a recording media 516. (The term "HAMR" as used herein refers to all variants of thermally-assisted recording, including "thermally assisted (magnetic) recording" (TAR or TAMR), "energy assisted magnetic recording" (EAMR), and "heat-assisted magnetic recording" (HAMR).) As is known in the art, a HAMR recording head can use a laser source and an optical waveguide coupled to a near-field transducer (NFT) to heat the recording material on a recording media 516. A "near-field" transducer refers to "near-field optics," wherein light is passed through a first element with subwavelength features and the light is coupled to a second element, such as a substrate (e.g., of a recording media 516), located a subwavelength distance from the first element. The NFT may have a generally triangular output end, such that an evanescent wave generated at a surface of the waveguide couples to surface plasmons excited on the surface of the NFT, and a strong optical near-field is generated at the apex of the triangular output end. A semiconductor laser with a wavelength of 780 to 980 nm may be used as the HAMR light source. The laser may be supported on the top of the slider 525, or it may be located on the flexure 530 (refer to FIG. 1) and coupled to the slider 525 by an optical channel.

FIG. 2 shows x-, y-, and z-axes for reference. The view in FIG. 2 is of a cross-section of the HAMR recording head 529A in the x-z plane, with the recording media 516 shown below the HAMR recording head 529A. With the axes as defined in FIG. 2, the data tracks on the recording media 516 reside in an x-y plane.

The portion of the HAMR recording head 529A example shown in FIG. 2 comprises a write head 220 (which may also referred to as a write portion) and a read head 280 (which may also be referred to as a read portion). The read head 280 and write head 220 are shown in relation to a recording media 516, which moves in the direction of the arrow 17.

The read head 280 may include any suitable components for reading the recording media 516, such as one or more of the read sensors described above in the discussion of FIG. 1 (e.g., TMR, GMR, etc.).

In the example of FIG. 2, the write head 220 includes a main pole 202, an NFT 240, a waveguide 270, an NFT temperature sensor 242, and a return pole 205. Also illustrated is a shield 225, which is situated between the NFT 240 and the NFT temperature sensor 242 (and between the waveguide 270 and the NFT temperature sensor 242). The write head 220 can include components not illustrated in FIG. 2. Likewise, the write head 220 need not include all of the components illustrated in FIG. 2.

As is known in the art, the main pole 202 creates magnetic fields that allow the magnetic recording layer of the recording media 516 to be written to, and the return pole 205 completes the magnetic circuit by providing a path for the magnetic field lines to return after interacting with the recording media 516. The main pole 202 and the return pole 205 may be made of any suitable material (e.g., a magnetic material such as iron, cobalt, nickel, a combination of two or more of these materials, etc.). Such materials are known in the art and are not discussed further herein. The main pole 202 has a pole tip at the ABS 260.

The write head 220 also includes a waveguide 270. As is known in the art, a waveguide is a structure used to guide and propagate electromagnetic waves, such as microwaves or light, along a path with low energy loss. The waveguide 270 may be a layer of core material generally parallel to the main pole 202 with a length orthogonal to the ABS 260, an end at the ABS 260, and a generally planar surface that faces and is parallel to the material making up the NFT 240. In some embodiments, the waveguide 270 is configured to receive radiation at a wavelength from a laser source and transmit the radiation at that wavelength to the NFT 240. Waveguides for use in HAMR are known in the art and are not described further herein.

The NFT 240, which is shown situated between the main pole 202 and the waveguide 270, is typically made of a material with high thermal stability, such as a plasmonic metal (e.g., gold, silver, aluminum, copper, ruthenium, rhodium, palladium, platinum, iridium, or alloys or combinations thereof). The NFT 240 is generally parallel to the waveguide 270 and main pole 202, and is located between and spaced from the waveguide 270 and the main pole 202. The NFT 240 has an output end at the ABS 260 and an input end that is recessed from the ABS 260. When light is introduced into the waveguide 270, an evanescent wave is generated at the surface of the waveguide 270 nearest the NFT 240 and couples to a surface plasmon excited on the surface of the NFT 240 nearest the waveguide 270. The surface plasmon propagates to the NFT 240 output end at the ABS 260.

Because of its function, the NFT 240 can reach high temperatures, which, if left uncorrected or continuing for too long a period of time, can cause the HAMR recording head 529A to fail. Thus, to monitor the temperature of the NFT 240, the HAMR recording head 529A may include a NFT temperature sensor 242. As shown in the example of FIG. 2, the NFT temperature sensor 242 may be positioned in the vicinity of the NFT 240 to detect temperature changes of the NFT 240.

The example of FIG. 2 includes a shield 225 situated on the other side of the waveguide 270 from the NFT 240. The shield 225 can comprise a magnetic or conductive material to reduce its impact on the NFT temperature sensor 242 signal.

The unshaded regions of the write head 220 in FIG. 2 may be formed of an insulating material such as, for example, alumina ($Al_2O_3$), silicon dioxide ($SiO_2$), etc., to protect the main pole 202 from thermal damage due to the operation of the write head 220, and also to electrically isolate the NFT 240 from the main pole 202.

It is to be appreciated that an implementation of a write head 220 may include components or elements (e.g., material layers, such as adhesion layers, etc.) not illustrated in FIG. 2, and that some of the components included in a write head 220 can be different (e.g., in position, characteristics, etc.) than shown in the example of FIG. 2. As explained above, the write head 220 need not include all of the components shown in FIG. 2.

Figure 3A:
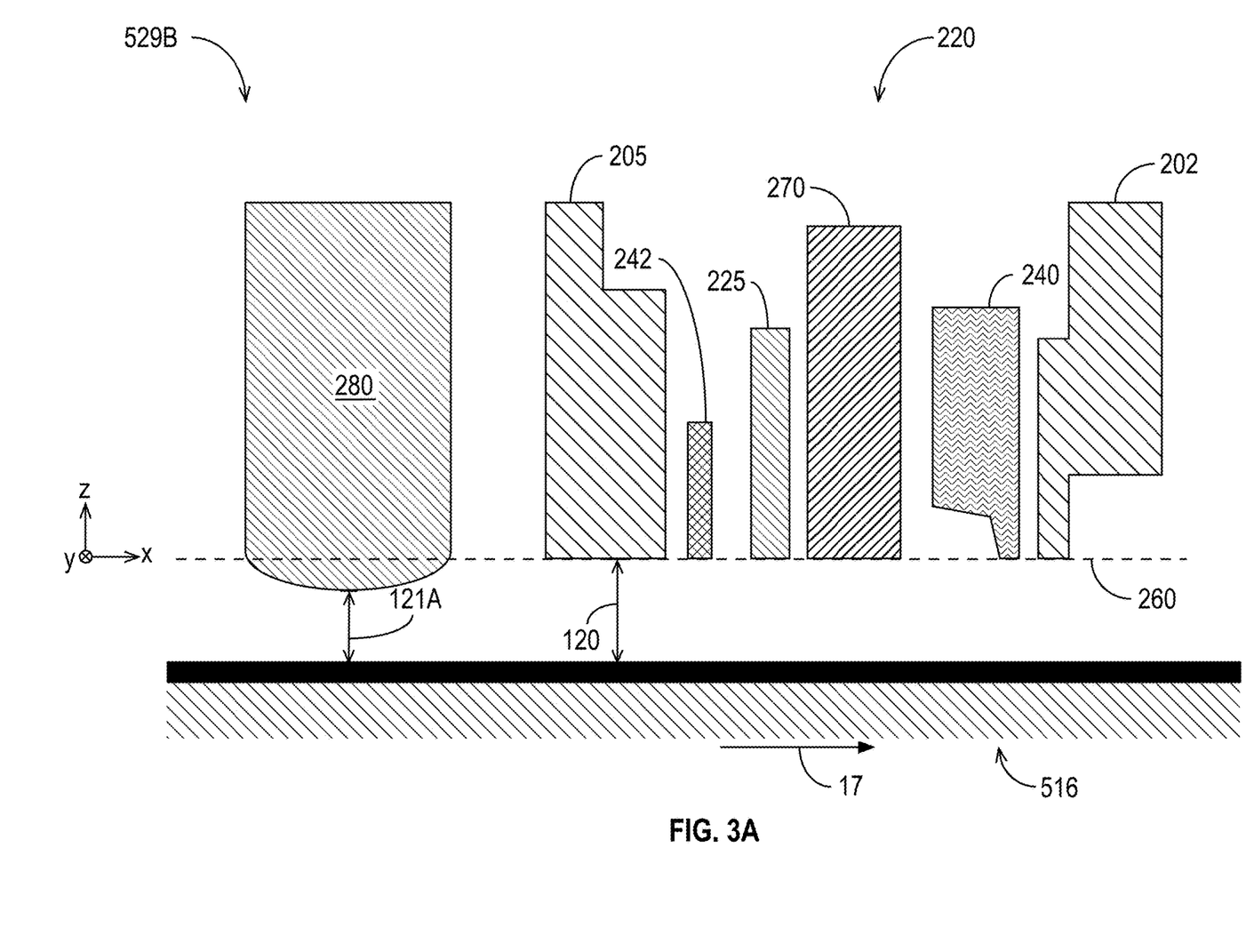
FIG. 3A is an illustration of an example HAMR recording head that has a protrusion in accordance with some embodiments.
Figure 3B:
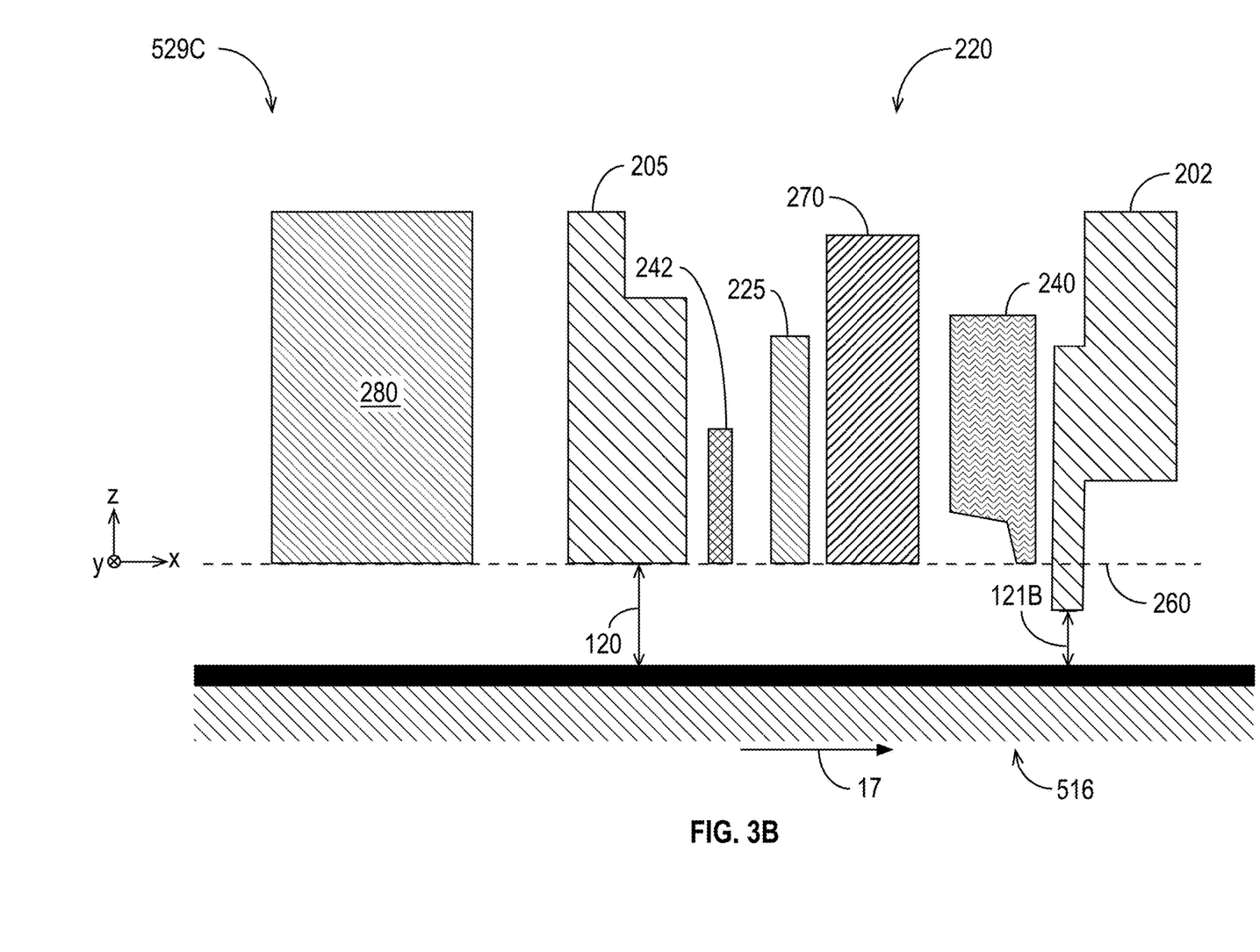
FIG. 3B is another illustration of an example HAMR recording head that has a protrusion in accordance with some embodiments.
Figure 3C:
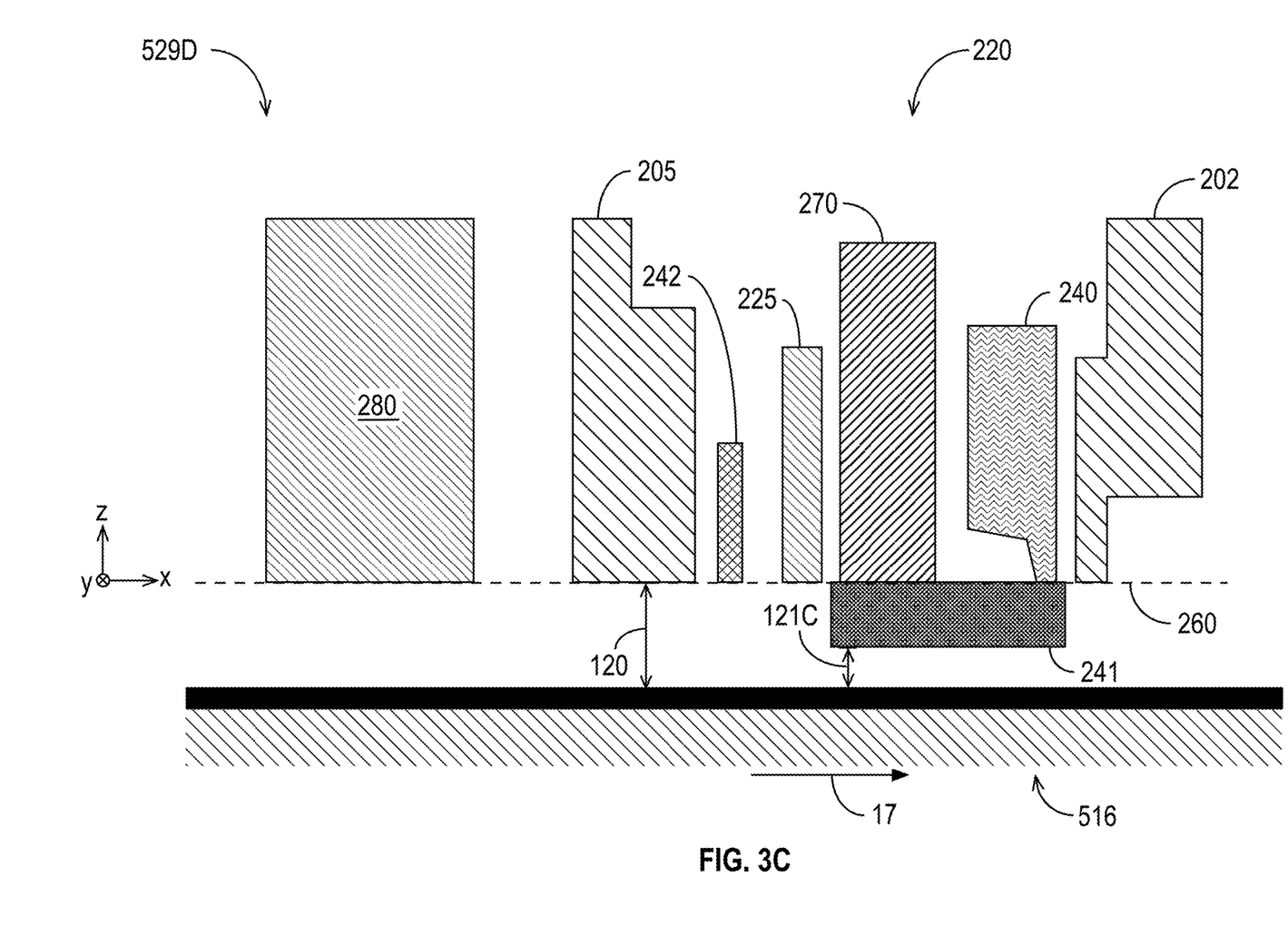
FIG. 3C is another illustration of an example HAMR recording head that has a protrusion in accordance with some embodiments.

Because excessive heating of the NFT 240 can cause performance degradation and eventually failure of the HAMR recording head 529A, to mitigate unwanted heating of the NFT 240, the NFT 240 may be covered at the ABS 260 by a durable transparent (glassy) material (e.g., $SiO_2$, NO, etc.) as shown in FIG. 3C, discussed below. For example, U.S. Pat. No. 11,127,421 to Siangchaew et al., which was filed on Feb. 8, 2021, issued on Sep. 21, 2021, and is hereby incorporated by reference in its entirety for all purposes, describes the use an optically-transparent protective film over some or all of the write head 220 at the ABS 260. This optically-transparent protective film is sometimes referred to herein as a "window." The light used by the write head 220 to heat the recording media 516 can penetrate the transparent material at the ABS 260 without heating it, which can allow the desired heating of the recording media 516 to be provided while preventing excessive heating of the NFT 240. The use of a transparent material to protect the write head 220 can substantially improve the lifetime of the NFT 240.

As will be appreciated by those having ordinary skill in the art, FIG. 2 presents an idealized view of the cross-section of the HAMR recording head 529A. For example, FIG. 2 shows the ABS 260 as flat in the x direction, and it also illustrates the surface of the recording media 516 as flat in the x-direction. As will be appreciated by those having ordinary skill in the art, in an implementation of a data storage device 500, neither the ABS 260 of the recording head 529 nor the surface of the recording media 516 will be perfectly flat at the scale of the features of the recording head 529.

The undesirable event of the recording head 529 coming into contact with the surface of the recording media 516 (e.g., during read or write operations) is referred to as a "touchdown." Touchdown can cause catastrophic damage to the recording head 529 and/or the data on the recording media 516. Therefore, the data storage device 500 may include mechanisms to detect the onset of touchdown and to prevent the recording head 529 from touching the recording media 516 during normal operation. For example, to mitigate the likelihood of touchdown during normal operation, a data storage device 500 may include TFC. The TFC can be different for reading and for writing.

For reading, the goal of TFC is to ensure that the read sensor remains at a consistent and, ideally, optimal distance (or within an optimal range or distances) from the recording media 516 to achieve accurate data readback and mitigate errors. There are a number of tools that can be used, individually or in combination, for reader TFC. For example, during the manufacturing process, each read head 280 can be calibrated to determine its optimal fly height for reading data reliably. This calibration process can involve measuring the performance of the read head 280 at various fly heights and selecting the best operating point for the given recording head 529.

As another example, firmware in the data storage device 500 may include a thermal expansion model that estimates the spacing between the read head 280 and the recording media 516 based on the operating temperature of the data storage device 500. As the temperature of the data storage device 500 changes during operation, the model can be used to predict how the recording head 529 and recording media 516 dimensions might change due to thermal effects.

As another example, the recording head 529 may include temperature sensors that monitor the operating temperature of the data storage device 500. As one example, the slider 525 may include an embedded contact sensor (ECS) embedded in the slider 525 near the recording head 529. The ECS may comprise a metallic strip located at the ABS of the recording head 529. In such a configuration, the resistance of the ECS may change in response to temperature changes. Thus, the voltage across the ECS can be used to sense touchdown as the temperature of the slider 525 changes as the slider 525 comes in close proximity to the recording media 516. Temperature sensors (e.g., ECS or other) can be used to provide feedback to a control system about the temperature of the data storage device 500, which can be used in conjunction with a thermal expansion model to estimate fly height changes.

As another example, the data storage device 500 may include a servo system to control the positioning of the read head accurately. Feedback from position sensors of the read head 280 can be used to maintain a constant fly height, ensuring the read head 280 follows variations in the topography of the recording media 516 while reading data.

As yet another example, the data storage device 500 may include adaptive control algorithms that continuously adjust the position of the read head 280 based on real-time temperature and sensor data. If present, this adaptability can help compensate for temperature-induced changes and other factors that might affect the fly height during read operations.

As another example, the actuator that positions the read head 280 over the recording media 516 may have fine control capabilities to dynamically adjust the position of the read head 280 during reading, taking into account factors such as temperature and variations in the recording media 516 surface.

Similarly, the writer TFC for a HAMR data storage device can use a variety of tools, independently or in combination. For example, the writer TFC can use a combination of empirical data, modeling, and feedback control mechanisms. As a specific example, a HAMR data storage device can include sensors and feedback mechanisms. These sensors can be optical or other types of sensors (e.g., an ECS, an NFT temperature sensor, etc.). Some of these sensors can be used to monitor the fly height during operation and detect the distance between the write head 220 and the recording media 516.

During the manufacturing process or initial setup, the data storage device 500 may undergo calibration to determine the optimal fly height for stable recording. This calibration may involve writing test patterns at different fly heights and measuring the performance of the written bits. As the data storage device 500 operates, it may be able to continue to monitor the performance of written bits and adjust the fly height accordingly. This type of data-driven control loop can help to maintain a consistent and optimal fly height throughout the lifetime of the data storage device 500.

When the data storage device 500 is a HAMR device, the temperature of the laser, as well as the heating duration, can be adjusted to control the thermal expansion of the recording media 516 and, consequently, the fly height. For example, thermal modeling techniques can be used to predict the expansion of the recording media 516 due to laser heating and estimate the resulting fly height changes. These models can take into account various factors such as, for example, the laser power, properties of the recording media 516, design of the recording head 529, etc. Adaptive control algorithms can be implemented to dynamically adjust the laser power or heating duration based on real-time feedback from fly height sensors. If present, this adaptability can improve the overall stability and reliability of the recording process.

One type of TFC uses an electrically-resistive heater located on the slider 525 near the recording head 529. When current is applied to the heater, the heater expands and causes the recording head 529 to expand and thus move closer to the surface of the recording media 516. The recording head 529 can be adjusted to different heights, depending on whether the data storage device 500 is reading or writing. Also, the heater can maintain the recording head 529 at an optimal or near-optimal fly-height even in the presence of factors (e.g., pitching, rolling) that could otherwise cause changes in the fly-height. The TFC heater can be calibrated using the value of heater power that results in onset of slider-media contact or touchdown. Methods, devices, and systems for sensing touchdown and for TFC are described, for example, in U.S. Pat. No. 10,395,678 to Rajauria et al., which was filed on Dec. 6, 2018, issued on Aug. 27, 2019, and is hereby incorporated by reference in its entirety for all purposes.

There are other ways to sense touchdown. For example, off-track or downtrack motion due to friction can be sensed. Conventional TFC approaches rely on the touchdown location of the recording head 529 being consistent from head to head. In other words, conventional approaches assume that the portion of the recording head 529 that makes contact with the recording media 516 during touchdown (e.g., for reading and/or for writing) is always approximately the same. Accordingly, conventional approaches detect touchdown and apply a back-off factor to provide a relatively consistent TFC, and consistent performance, in operation, because the touchdown location is consistent.

For example, in the example HAMR recording head 529A shown in FIG. 2, all of the features of the ABS 260 are approximately the same distance 120 from the surface of the recording media 516. Accordingly, the ABS 260 provides a large touchdown area, and conventional, friction-based approaches can reliably detect the onset of touchdown.

In general, for a variety of reasons, a recording head 529 can have one or more protrusions from the ABS 260, toward the recording media 516. For example, there may be one or more add-on features using various materials such as carbon, titanium, silicon nitride, etc. (e.g., to make a window over an NFT 240, as described above). As another example, a recording head 529 may have one or more protrusions remaining after the manufacturing process due to some materials that can be used in the slider 525 being more resistant to etching and/or lapping than other materials used in the slider 525. For example, some materials (e.g., ruthenium, titanium, rhodium, platinum, palladium, etc.) that may be included in the recording head 529 are resistant to corrosion and chemical attack, which makes them relatively difficult to etch compared to other metals used in the recording head 529. (As would be understood by those having ordinary skill in the art, etching is a process that involves selectively removing material from the surface of a material using an etchant, which is typically an acid or a chemical solution.) As a result, features that include these etching-resistant materials can protrude from the ABS 260 more than other features.

There are other reasons why an ABS 260 and the media-facing surface of a recording head 529 can have protrusions. For example, protrusions might be intentionally designed into the slider 525 to enhance its aerodynamic characteristics and/or improve its performance in maintaining a stable flying height above the surface of the recording media 516. As another example, there may be manufacturing variations that cause unintentional protrusions to be created during the manufacturing process (e.g., due to tolerances in production equipment, material properties, or other factors that affect the shaping and finishing of the slider 525 and/or recording head 529). As yet another example, protrusions can occur as a result of damage or wear to the slider 525 and/or the recording head 529 after manufacturing (e.g., due to mishandling, improper installation, usage conditions that exceed design specifications, high temperatures, etc.), which may cause deformations or protrusions of the ABS 260. As yet another example, protrusions can be the result of manufacturing defects, such as errors in the production process or quality control issues, which can lead to non-uniformity or unintended shaping of the ABS 260.

Whatever their origin, in general, protrusions at the ABS 260 can have any shape (e.g., in an ABS view, they can be circular, oval, rectangular, trapezoidal, irregularly shaped, etc.). The size of a protrusion can vary (e.g., from around 1 micron to around 10 microns). A protrusion can protrude from the rest of the ABS 260 by a variety of distances (e.g., from around 0.5 nm to more than 3 nm). As explained above, the protrusions can exist for a variety of reasons (e.g., due to manufacturing variability).

Regardless of the origin of a protrusion (or protrusions) or reason(s) that the ABS 260 (or the media-facing surface of the recording head 529) includes a protrusion (or protrusions), the existence of one or more protrusions can increase the difficulty of detecting touchdown. FIGS. 3A, 3B, and 3C illustrate how variations in the locations of protrusions at the ABS 260 can complicate TFC. FIG. 3A is an illustration of a HAMR recording head 529B that has a protruding read head 280 relative to the write head 220. As shown, the write head 220 is a distance 120 from the surface of the recording media 516, whereas the read head 280 is a distance 121A from the recording media 516, where the distance 121A is less than the distance 120. The read head 280 might protrude relative to the write head 220 for a variety of reasons (e.g., intentional design, manufacturing variability, etc.).

FIG. 3B is an illustration of a HAMR recording head 529C that has a protruding main pole 202 relative to the rest of the HAMR recording head 529C. As shown, the main pole 202 is a distance 121B from the surface of the recording media 516, whereas the rest of the HAMR recording head 529C is a distance 120 from the recording media 516, where the distance 121B is less than the distance 120. The main pole 202 might protrude, for example, due to manufacturing variability.

FIG. 3C is an illustration of a HAMR recording head 529D that has a window 241 over a portion of the write head 220, including the NFT 240 (e.g., to protect the NFT 240 from overheating, as explained above). As illustrated in FIG. 3C, the window 241 creates a protrusion from the ABS 260 toward the surface of the recording media 516 that results from a deliberate design choice. The media-facing surface of the window 241 is a distance 121C from the surface of the recording media 516, whereas the rest of the HAMR recording head 529D is a distance 120 from the surface of the recording media 516, where the distance 121C is less than the distance 120.

The variability in the locations of the protrusions shown in FIGS. 3A, 3B, and 3C complicates TFC (setting the fly height). Assuming that the recording head 529 remains oriented as illustrated in FIGS. 3A, 3B, and 3C as the slider 525 moves toward the recording media 516 in the z-direction, it is evident that different portions of the HAMR recording head 529B, the HAMR recording head 529C, and the HAMR recording head 529D will be the first to touch down. For example, the read head 280 of the HAMR recording head 529B will touch down, whereas the main pole 202 of the HAMR recording head 529C will touch down, and the window 241 over the NFT 240 of the HAMR recording head 529D will touch down. Furthermore, amount by which the protrusions extend from the ABS 260 can differ, which means the distance 121A, the distance 121B, and the distance 121C can also differ.

Accordingly, protrusions, which can be small and in variable locations from device to device, present two challenges for TFC. First is the challenge of setting the fly height when the touchdown location is variable from head to head (e.g., as illustrated by FIGS. 3A, 3B, and 3C, touchdown in a first device might be near the read sensor, whereas touchdown in a second device might be near or at the main pole 202, whereas touchdown in a third device might be at a window 241 over the NFT 240, etc.). Second is the challenge of detecting or identifying the onset of touchdown of physically small protrusions without causing wear to such protrusions (e.g., due to heat, breakage, etc.).

Disclosed herein are devices, systems, and methods that address these challenges to provide for accurate detection/identification of the onset of touchdown and setting of the TFC.

To overcome the problem that protrusions of the recording head 529 can be in a variety of locations, settings for the touchdown procedure can be selected to force a particular, known location of the recording head 529 to be the touchdown location. For example, assume the write head 220 includes a window 241 over the NFT 240, which causes a protrusion. To determine the appropriate TFC power for writing, a large enough write current, which can be denoted as IADn, can be applied to force the window 241 to be the touchdown location for all conditions and all recording heads 529.

To overcome the problem that conventional, friction-based approaches do not reliably detect the onset of touchdown of small protruding features, the onset of touchdown can be detected using a temperature sensor. When the touchdown procedure begins, the TFC power increases in steps, which gradually brings the recording head 529 closer to the surface of the recording media 516. Initially, as the recording head 529 moves toward the surface of the recording media 516, the sensed temperature increases. As the recording head 529 approaches the recording media 516 surface, however, air-bearing and/or recording media 516 cooling tends to reduce the temperature. Therefore, by monitoring changes in the temperature detected by the temperature sensor, the onset of touchdown can be detected.

For purposes of example, some of the following discussion assumes that an NFT temperature sensor 242 is used to detect the onset of touchdown. The use of the NFT temperature sensor 242 to sense the onset of touchdown can be particularly advantageous to set the writer TFC power, because the NFT temperature sensor 242 is close to the main pole 202. It is to be understood, however, that other temperature sensors can be used alternatively or in addition. For example, a temperature sensor close to or in the read head 280 could be used to detect the onset of touchdown in order to set the TFC power for reading.

Figure 4:
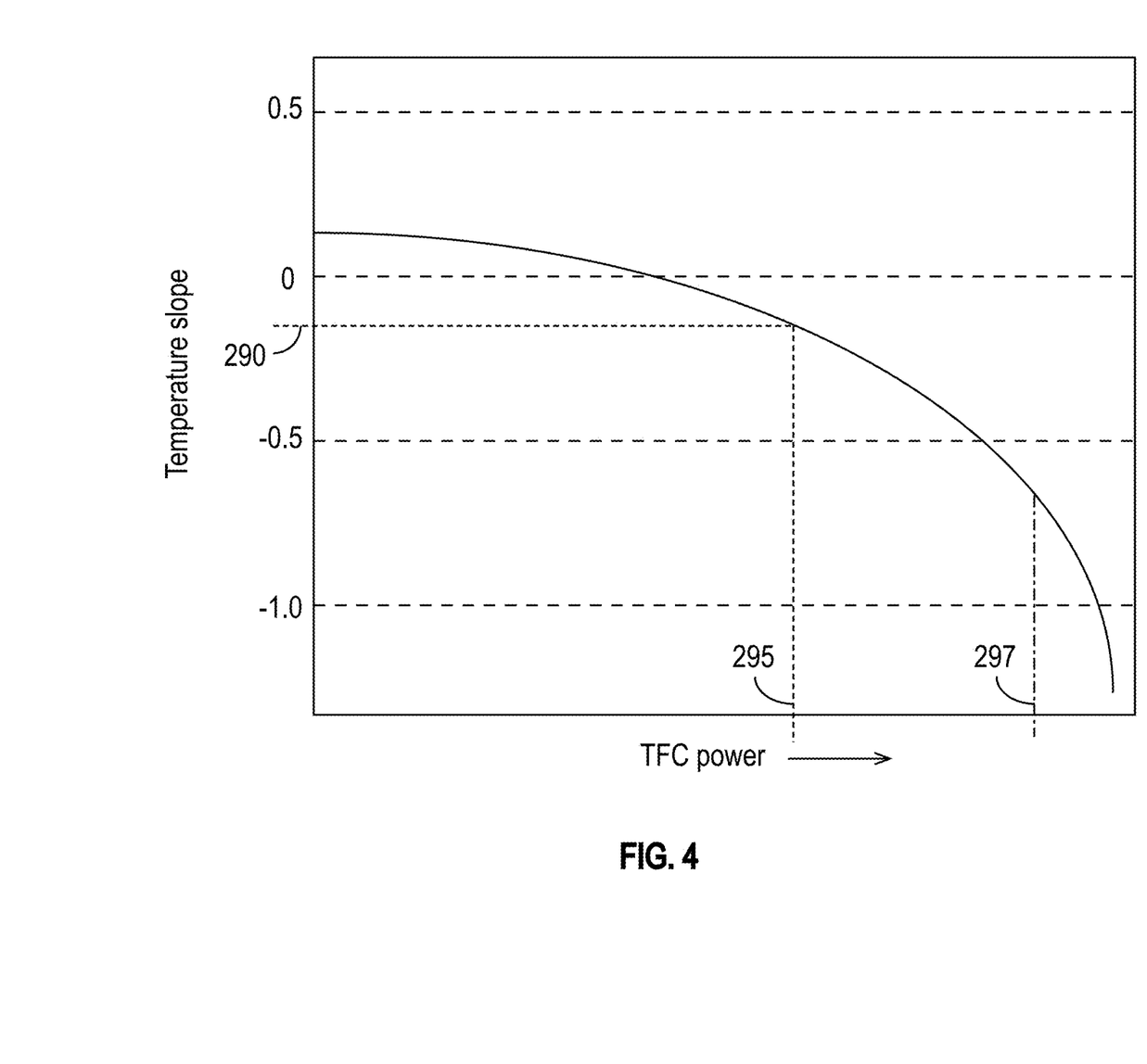
FIG. 4 is an example of a plot of temperature sensor slope as a function of TFC power in accordance with some embodiments.

During the touchdown-detection procedure, the TFC power can be increased incrementally (e.g., in steps). By monitoring temperature differences caused by sequential steps in TFC power, the onset of touchdown can be detected. FIG. 4 is an example of a plot of temperature sensor slope as a function of TFC power. The temperature sensor slope can be determined, for example, as the difference in temperature between the (i+1)th and ith steps in the TFC power setting progression. A slope threshold 290 can be established as indicating the onset of touchdown. Once the temperature sensor slope reaches the slope threshold 290, the current TFC power setting (e.g., the TFC power at the (i+1)th step) is the power resulting in the onset of touchdown, referred to herein as the OTD power 295.

If the TFC power were to continue to be increased beyond the OTD power 295, friction-based techniques eventually would be able to detect the onset of touchdown at a friction-detection power level 297, which, as shown in FIG. 4, is higher than the OTD power 295. At the friction-detection power level 297, touchdown has actually occurred, and the protrusion that touched down at a TFC power level between the OTD power 295 and the friction-detection power level 297 might have been damaged or worn down. By detecting when the temperature sensor slope meets or drops below the slope threshold 290, the onset of touchdown can be detected even for small features in the vicinity of the temperature sensor (e.g., an NFT temperature sensor 242).

Choosing an appropriate slope threshold 290 is within the level of ordinary skill in the art. For example, a value around −0.25 could be appropriate, as shown in FIG. 4.

Once the OTD power 295 has been determined, it can be taken into account to set the TFC power. For example, as explained above, the current IADn can be used to force the location of the onset of touchdown to be consistent for all conditions and for all recording heads 529. For example, for a HAMR recording head 529D (refer to FIG. 3C), the touchdown location could be forced to be the window 241. To set the TFC power, the OTD power 295 can be added by the power corresponding to the IADn, and a backoff factor can be subtracted. The power corresponding to the IADn may be calculated and/or stored in firmware of the data storage device 500.

The backoff factor can be used to provide sufficient clearance between the recording head 529 and the recording media 516. Any applicable consideration(s) can be taken into account in determining the backoff factor. For example, the backoff factor can take into account the design of the recording head 529. As a specific example, for setting the TFC for writing, the backoff factor can take into account any expected protrusion of the main pole 202 pole tip during write operations (which may be referred to as the expected write-current-induced pole tip protrusion during write operations). Similarly, for setting the TFC power for reading, the backoff factor can take into account any expected protrusion of the read head 280 during read operations. As another example, for a HAMR recording head 529, the backoff factor can take into account any laser-induced protrusion of the main pole 202 pole tip. The backoff factor may provide for a minimum spacing between the recording head 529 and the surface of the recording media 516.

Figure 5:
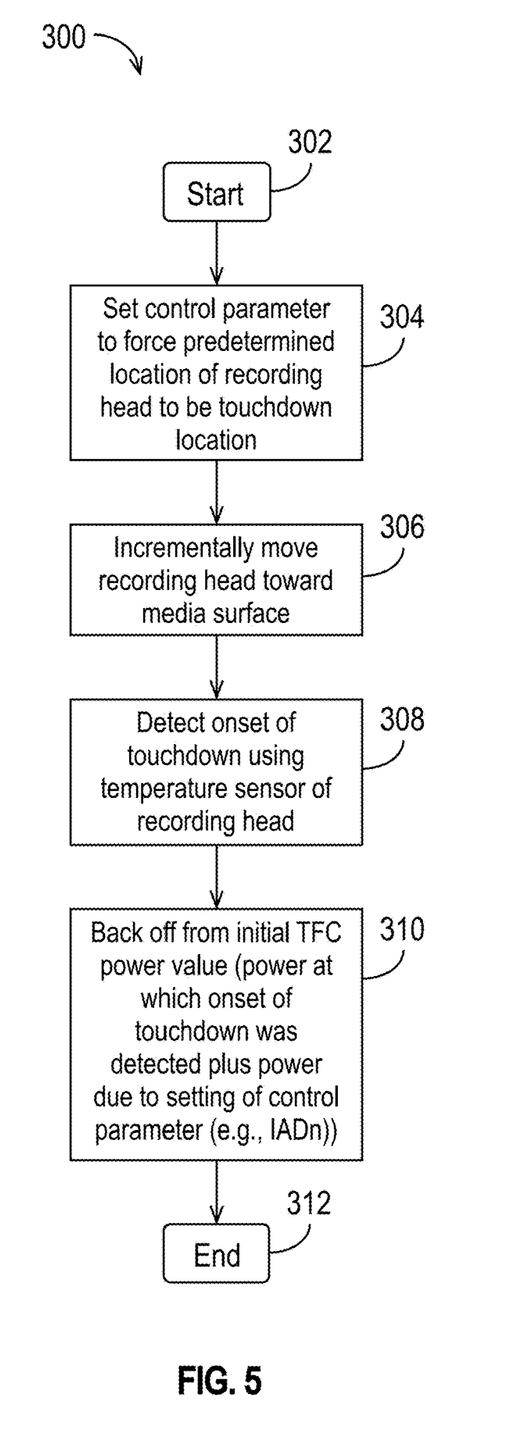
FIG. 5 is a flow diagram illustrating a method of implementing TFC in accordance with some embodiments.

FIG. 5 is a flow diagram illustrating a method 300 of implementing TFC in accordance with some embodiments. At block 302, the method 300 begins. At block 304, a control parameter is set to force the touchdown location to be a predetermined, known location of the media-facing surface (e.g., the ABS 260) of the recording head 529. The control parameter can be, for example, a write current amplitude (e.g., IADn, described above). The predetermined location of the recording head 529 can be, for example, a designed protrusion extending from the media-facing surface (e.g., ABS 260) of the recording head 529 (e.g., a window 241 over at least a portion of the write head at the ABS 260).

Figure 6:
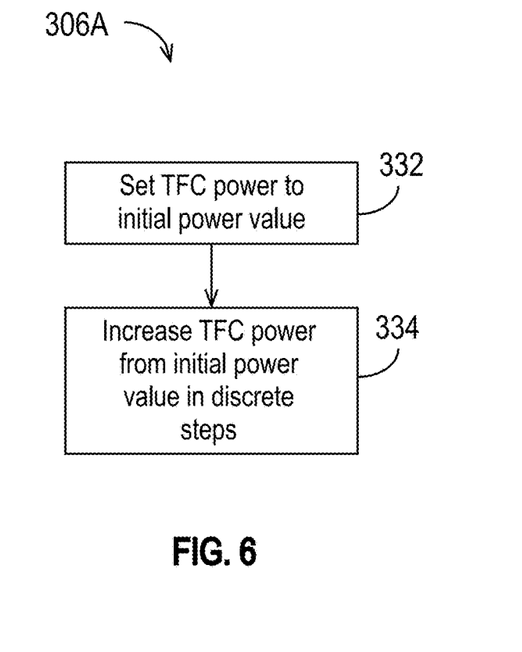
FIG. 6 illustrates an example of a method of implementing a portion of the method shown in the flow diagram of FIG. 5 in accordance with some embodiments.

At block 306, the recording head 529 is incrementally moved toward the surface of the recording media 516. In other words, the distance between the recording head 529 and the surface of the recording media 516 is decreased in steps. For example, a current provided to the recording head 529 can be increased incrementally. FIG. 6 illustrates one example of a method 306A by which block 306 can be accomplished in accordance with some embodiments. At block 332, the TFC power is set to an initial power value. At block 334, the TFC power is increased from its initial value in discrete steps, thereby moving the recording head 529 closer to the surface of the recording media 516 in discrete steps.

Returning to FIG. 5, at block 308, the onset of touchdown is detected using a temperature sensor (e.g., an NFT temperature sensor 242) of the recording head 529. The onset of touchdown can be detected in a variety of ways. For example, if the block 306 is carried out by the method 306A, then at each of the discrete steps of block 334, the temperature sensor can sense the temperature. As described above, the onset of touchdown can be detected by monitoring the temperature slope, using readings from the temperature sensor, and determining whether the temperature slope meets a condition. In some embodiments, the onset of touchdown is declared when the temperature slope is less than or equal to a threshold (e.g., slope threshold 290 in FIG. 4), which may be predetermined and/or based on modeling (e.g., conducted during the slider 525 or recording head 529 design process).

At block 310, the TFC power is backed off from the sum of the power corresponding to the control parameter (e.g., IADn) and the value of the TFC power when the onset of touchdown was detected at block 308 (e.g., referring to FIG. 4, the TFC power is backed off from the sum of the OTD power 295 and the power corresponding to the control parameter setting (e.g., IADn)). The amount by which the TFC power is backed off can be any suitable amount. For example, as described above, for setting the TFC power for writing, the backoff factor can take into account any expected protrusion of the main pole 202 pole tip during write operations. Similarly, for setting the TFC power for reading, the backoff factor can take into account any expected protrusion of the read head 280 during read operations. As another example, for a HAMR recording head 529, the backoff factor can take into account any laser-induced protrusion of the main pole 202 pole tip. The backoff factor may provide for a minimum spacing between the recording head 529 and the surface of the recording media 516 for reading and/or writing operations.

At block 312, the method 300 ends.

Figure 7:
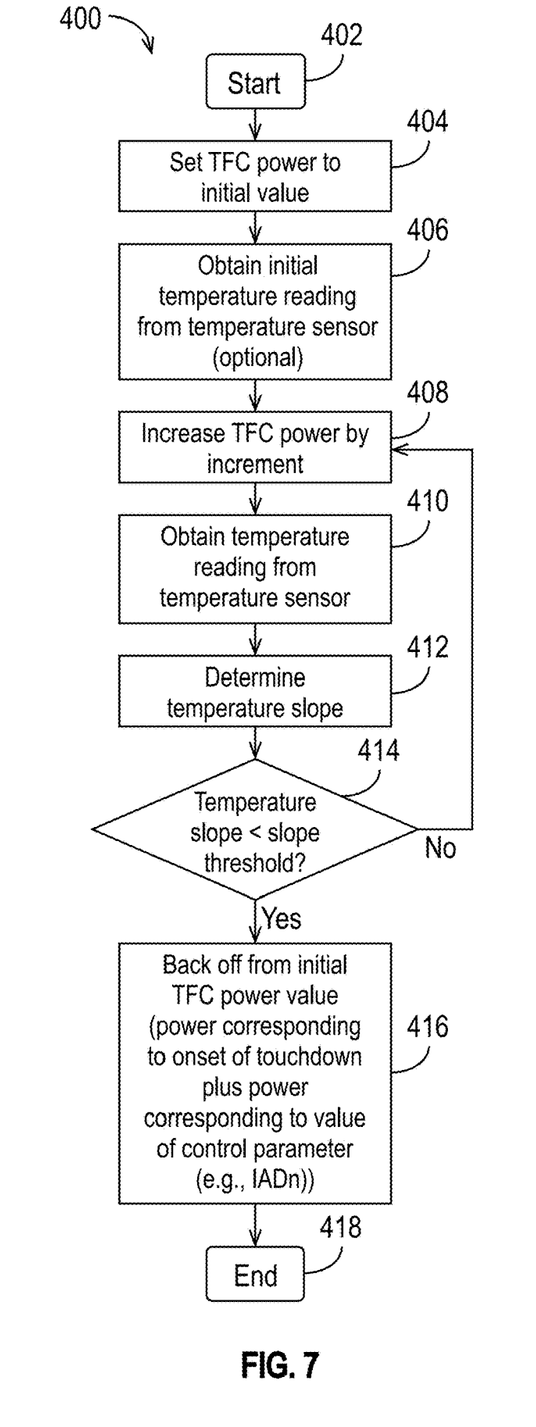
FIG. 7 is another flow diagram illustrating a method of implementing TFC in accordance with some embodiments.

FIG. 7 is another flow diagram illustrating a method 400 of implementing TFC in accordance with some embodiments. The method 400 can be performed, for example, when a touchdown location of the recording head 529 is known and/or has been forced to be the touchdown location by setting a control parameter (e.g., as described above in the discussion of FIG. 5 and elsewhere herein). At block 402, the method 400 begins. At block 404, the TFC power is set to an initial value (e.g., a value below the OTD power 295). Optionally, at block 406, an initial temperature reading is obtained from a temperature sensor of the recording head 529 (e.g., an NFT temperature sensor 242). At block 408, the TFC power is increased by an incremental amount (e.g., a stepped amount, such as the amount of power represented by the least significant bit of a digital-to-analog converter (DAC)). At block 410, a temperature reading is obtained from a temperature sensor (e.g., an NFT temperature sensor 242) after the increase in TFC power. At block 412, the temperature slope is determined (e.g., using the reading obtained at block 410 and at least one previously-obtained reading (e.g., at block 406 or a prior iteration that included block 410 via the "No" path from decision point 414, described below)).

At decision point 414, it is determined whether the temperature slope determined at block 412 is less than (or less than or equal to) a threshold (e.g., slope threshold 290 in FIG. 4). If so, then it is presumed that the onset of touchdown has been detected, and, at block 416, the TFC power is backed off from its current value (e.g., OTD power 295 in FIG. 4), taking into account the power corresponding to the value of the control parameter (e.g., by adding IADn to the ODT power 295). If, at decision point 414, it is determined that the temperature slope is not less than the slope threshold, then the method 400 loops back to block 408. Each time the loop is performed, the TFC power is increased by another incremental amount at block 408, a temperature reading is obtained by the temperature sensor at block 410, the temperature slope is determined at block 412, and the determination at the decision point 414 is made again. This loop is performed until the answer at decision point 414 is "Yes."

When, at decision point 414, it is determined that the temperature slope is less than (or less than or equal to) the threshold (e.g., the slope threshold 290 in FIG. 4), it is presumed that the onset of touchdown has been detected, and the TFC power is backed off from its current value (e.g., the OTD power 295 in FIG. 4) after adding the power corresponding to the control parameter (e.g., IADn). The amount by which the TFC power is backed off can be any suitable amount. For example, as described above, for setting the TFC power for writing, the backoff factor can take into account any expected protrusion of the main pole 202 pole tip during write operations. Similarly, for setting the TFC power for reading, the backoff factor can take into account any expected protrusion of the read head 280 during read operations. As another example, for a HAMR recording head 529, the backoff factor can take into account any laser-induced protrusion of the main pole 202 pole tip. The backoff factor may provide for a minimum spacing between the recording head 529 and the surface of the recording media 516 for reading and/or writing operations. The TFC power can be backed off using any suitable approach. For example, a TFC power adjustment can be calculated and subtracted from the TFC power value at which the onset of touchdown was detected (e.g., OTD power 295 in FIG. 4) after adding the power corresponding to the control parameter (e.g., IADn).

At block 418, the method 400 ends.

Figure 8:
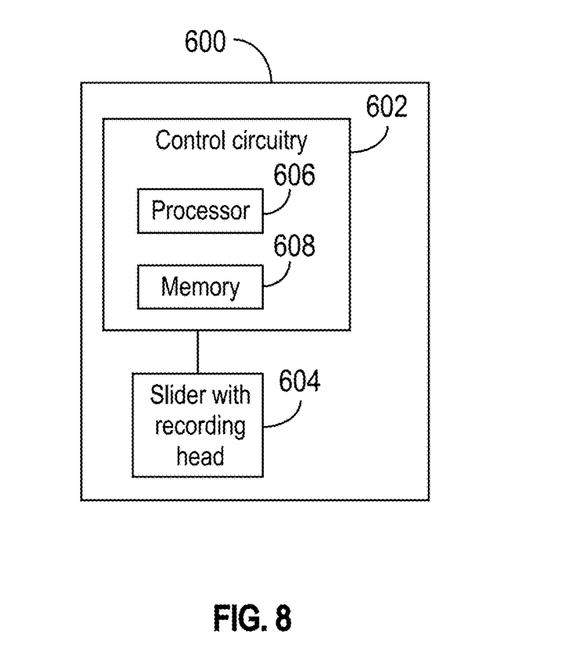
FIG. 8 is a simplified diagram of an example subset of components of a data storage device that can be involved in the implementation of the techniques described herein in accordance with some embodiments.

As explained in the discussion of FIG. 1, the techniques described herein can be implemented in a data storage device 500. FIG. 8 is a simplified diagram of an example subset of components 600 of the data storage device 500 that can be involved in the implementation of the techniques described herein in accordance with some embodiments. As shown in the example of FIG. 8, the subset of components 600 can include control circuitry 602 and a slider/recording head 604 (e.g., a slider 525 with a recording head 529). The slider/recording head 604 is coupled to the control circuitry 602.

The control circuitry 602 can include, for example, a processor 606 and memory 608, which may be coupled to the processor 606. In some embodiments, the processor 606 is configured to execute machine-executable instructions, which may be stored in memory 608. The machine-executable instructions can cause the processor 606 to participate in and coordinate implementation of the method 300 and/or the method 400 described above. For example, the processor 606 can control or instruct another component of the data storage device 500 to increase or decrease the TFC power. The processor 606 can perform calculations and comparisons (e.g., to implement block 308 of FIG. 5 and/or block 412 and/or decision point 414 of FIG. 7). The processor 606 and/or memory 608 can included in, for example, the chip 550. The control circuitry 602 can include components not illustrated in FIG. 8 (e.g., wiring, etc.).

The machine-executable instructions can be stored, for example, on a non-transitory computer-readable medium.

It is to be understood that the control circuitry 602 can include any component(s) to assist in implementing the techniques described herein. For example, the control circuitry 602 can include components connected or coupled to a current source (e.g., to provide a write current to the recording head 529). As another example, the control circuitry 602 can include components connected or coupled to an actuator (e.g., the rotary actuator assembly 540, a fly height actuator (FHA) (e.g., a thermal actuator that adjusts the fly height through thermal expansion, or a mechanical actuator such as a piezoelectric actuator that adjusts the fly height through mechanical deflection), etc.).

The efficacy of the techniques disclosed herein was verified by testing. The onset of touchdown was detected ninety times for each of six samples of a recording head 529. For each of the six samples, there was little variation in the detected OTD power 295 over the ninety tests. There was variation in the detected OTD power 295 from recording head 529 to recording head 529, but the OTD power 295 detected for each of the six samples varied little. Thus, the techniques described herein provide high consistency and good repeatability.

Furthermore, the six samples were inspected, and no wear was observed, which indicates that the onset of touchdown was reliably and correctly detected without the wear and/or damage that would have been expected from friction-based approaches.

Although the discussion above primarily used a HAMR recording head 529 as an example, it is to be appreciated that the same or similar techniques can be used for other types of recording heads 529 (e.g., MAMR, etc.).

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A method of setting a flying height of a recording head, the method comprising:
   setting a value of a control parameter of the recording head to force a predetermined location of the recording head to be a touchdown location;
   after setting the value of the control parameter, incrementally moving the recording head toward a surface of a recording media;
   using a temperature sensor of the recording head, detecting an onset of touchdown at the touchdown location as the recording head is incrementally moving toward the surface of the recording media; and
   backing off from an initial fly-height control power value, wherein the initial fly-height control power value is a sum of (a) a power level at which the onset of touchdown at the touchdown location was detected and (b) a power corresponding to the value of the control parameter.

2. The method of claim 1, wherein the recording head comprises a write head, and wherein the control parameter is a write current amplitude, and the temperature sensor comprises a near-field transducer (NFT) temperature sensor.

3. The method of claim 1, wherein the predetermined location of the recording head is a protrusion extending from a media-facing surface of the recording head.

4. The method of claim 3, wherein the recording head comprises a write head, and wherein the protrusion is a window over at least a portion of the write head.

5. The method of claim 4, wherein the control parameter is a write current amplitude, and wherein the temperature sensor comprises a near-field transducer (NFT) temperature sensor.

6. The method of claim 1, wherein detecting the onset of touchdown at the touchdown location comprises determining that a temperature sensor slope meets a condition.

7. The method of claim 6, wherein the condition is that the temperature sensor slope is less than a threshold.

8. The method of claim 7, wherein the threshold is predetermined and/or is determined based on modeling.

9. The method of claim 1, wherein backing off from the initial fly-height control power value comprises adjusting the initial fly-height control power value based on one or more of: (a) an expected write-current-induced pole tip protrusion during write operations, (b) a laser-induced pole tip protrusion, or (c) a back-off height during write operations.

10. The method of claim 1, wherein incrementally moving the recording head toward the surface of the recording media comprises:
    setting a fly-height control power to an initial power value; and
    in one or more discrete steps, increasing the fly-height control power from the initial power value,
    and wherein detecting the onset of touchdown at the touchdown location as the recording head is incrementally moving toward the surface of the recording media comprises the temperature sensor of the recording head detecting a temperature at each of the one or more discrete steps.

11. A data storage device, comprising:
    a recording media;
    a slider comprising a recording head, the recording head comprising a temperature sensor; and
    control circuitry coupled to the recording head, wherein:
        a media-facing surface of the recording head comprises a protrusion extending toward a surface of the recording media, and
        the control circuitry is configured to:
            (a) set a value of a control parameter of the recording head to force the protrusion to be a touchdown location,
            (b) after (a):
                (i) move the recording head toward the surface of the recording media in a plurality of increments, and
                (ii) obtain temperature readings from the temperature sensor at the plurality of increments,
            (c) determine a temperature slope using the temperature readings,
            (d) based on the temperature slope, identify an onset of touchdown at the touchdown location, and
            (e) reduce an initial fly-height control power value, wherein the initial fly-height control power value is a sum of (1) a power level at which the onset of touchdown at the touchdown location was identified and (2) a power corresponding to the value of the control parameter.

12. The data storage device recited in claim 11, wherein the control parameter is a write current amplitude.

13. The data storage device recited in claim 12, wherein the protrusion is a window over at least a portion of a write head, and wherein the temperature sensor is a near-field transducer (NFT) temperature sensor.

14. The data storage device recited in claim 11, wherein the control circuitry comprises a processor configured to execute machine-executable instructions.

15. The data storage device recited in claim 14, wherein, when executed by the processor, the machine-executable instructions cause the processor to identify the onset of touchdown at the touchdown location by comparing the temperature slope to a threshold.

16. The data storage device recited in claim 14, wherein, when executed by the processor, the machine-executable instructions cause the processor to reduce the initial fly-height control power value by subtracting (a) an expected write-current-induced pole tip protrusion during write operations, (b) a laser-induced pole tip protrusion, or (c) a back-off height during write operations.

17. The data storage device recited in claim 11, wherein the control circuitry is configured to move the recording head toward the surface of the recording media in increments by incrementally increasing a current provided to the recording head.

18. The data storage device recited in claim 17, wherein the current is a write current.

19. The data storage device recited in claim 11, wherein the control circuitry is configured to identify the onset of touchdown at the touchdown location in response to the temperature slope being less than or equal to a threshold.

20. A non-transitory computer-readable medium comprising machine-executable instructions that, when executed, cause at least one processor to:
    (a) set a value of a control parameter of a recording head to force a protrusion of the recording head to be a touchdown location;
    (b) after (a):
        (i) direct an actuator to move the recording head toward a recording media in a plurality of increments, and
        (ii) obtain, from a temperature sensor of the recording head, temperature readings at the plurality of increments;
    (c) determine a temperature slope using the temperature readings;
    (d) based on the temperature slope, identify an onset of touchdown at the touchdown location;
    (e) calculate a fly-height control power adjustment; and
    (f) subtract the fly-height control power adjustment from an initial fly-height control power value, wherein the initial fly-height control power value is a sum of (1) a power level at which the onset of touchdown at the touchdown location was identified and (2) a power corresponding to the value of the control parameter.

21. The non-transitory computer-readable medium recited in claim 20, wherein the control parameter of the recording head is a write current, and wherein the fly-height control power adjustment comprises a component representing an expected write-current-induced pole tip protrusion during write operations.

* * * * *